US012435865B2

(12) United States Patent
Mullen

(10) Patent No.: US 12,435,865 B2
(45) Date of Patent: Oct. 7, 2025

(54) LANDSCAPE LIGHTING FIXTURE AND MOUNT SYSTEM

(71) Applicant: Nate Mullen, Valley Center, CA (US)

(72) Inventor: Nate Mullen, Valley Center, CA (US)

( * ) Notice: Subject to any disclaimer, the term of this patent is extended or adjusted under 35 U.S.C. 154(b) by 99 days.

(21) Appl. No.: 17/219,488

(22) Filed: Mar. 31, 2021

(65) Prior Publication Data

US 2025/0116395 A1 Apr. 10, 2025

Related U.S. Application Data

(62) Division of application No. 16/990,861, filed on Aug. 11, 2020, now Pat. No. 11,067,262, which is a division of application No. 16/560,434, filed on Sep. 4, 2019, now Pat. No. 10,746,382.

(60) Provisional application No. 62/727,127, filed on Sep. 5, 2018.

(51) Int. Cl.
*F21V 21/08* (2006.01)
*F21V 21/28* (2006.01)
*F21W 131/10* (2006.01)

(52) U.S. Cl.
CPC .......... *F21V 21/0824* (2013.01); *F21V 21/28* (2013.01); *F21W 2131/10* (2013.01)

(58) Field of Classification Search
CPC ...... F21V 21/0824; F21V 21/28; F21V 5/008; F21V 5/043; F21V 5/046; F21W 2131/10
See application file for complete search history.

(56) References Cited

U.S. PATENT DOCUMENTS 5,599,091 A * 2/1997 Kira ........................ F21V 21/30 362/427
6,491,407 B1 * 12/2002 Beadle .............. G02F 1/133308 362/372
6,612,720 B1 * 9/2003 Beadle ................ F21V 21/0824 362/342
7,494,252 B1 * 2/2009 Thornton ................ F21V 29/15 362/648
11,125,414 B2 * 9/2021 Shih ........................ F21V 5/045
11,313,537 B2 * 4/2022 Nanninga ............... F21V 21/30
2010/0118537 A1 * 5/2010 Shin .......................... F21K 9/66 362/268
2013/0208489 A1 * 8/2013 Schmuckle ............. F21V 21/02 362/363
2014/0119022 A1 * 5/2014 Beausoleil .......... F21V 21/0824 362/294

(Continued)

*Primary Examiner* — Zheng Song
(74) *Attorney, Agent, or Firm* — Michael A. DiNardo; YK LAW LLP

(57) ABSTRACT

A multi-axis pivoting knuckle for a light fixture that allows for pivoting the light fixture about a horizontal axis and rotating the light fixture about a vertical axis. A single tightening bolt can secure movement of the light fixture in both axes. Tightening the bolt compresses a face plate that secures a brake pad against a toothed neck around the vertical axis of rotation. Tightening the same bolt also compresses a top stem against a base mount to engage annular geared teeth on each. A ground stake has a slotted neck port for receiving a base stem with lugs on the pivoting knuckle. A rotating collar on the neck port can selectively block the slots on the neck port. A wire slot is provided through the ground stake, neck port, and rotating collar allowing for removal and insertion of connected electrical wires.

4 Claims, 23 Drawing Sheets

(56) References Cited

U.S. PATENT DOCUMENTS

| | | | | |
|---|---|---|---|---|
| 2018/0362126 | A1* | 12/2018 | Christensen | F21V 14/02 |
| 2022/0252244 | A1* | 8/2022 | Erdener | F21V 23/007 |

* cited by examiner

LANDSCAPE LIGHTING FIXTURE AND MOUNT SYSTEM

RELATED APPLICATIONS

This application is a divisional of U.S. application Ser. No. 16/990,861, filed Aug. 11, 2020, which is a divisional of U.S. application Ser. No. 16/560,434, Sep. 4, 2019 (now U.S. Pat. No. 10,746,382), which claims the benefit of U.S. Provisional Application No. 62/727,127, filed on Sep. 5, 2018.

BACKGROUND OF THE INVENTION

The present invention is directed to a landscape lighting fixture and mounting system. More particularly, the landscape lighting fixture is has a hosing body that provides for fast and convenient assembly and adjustment. In addition, the mounting system provides for alternate options that can be easily implemented and adjusted depending upon the location and position of installation.

Prior art light fixtures are often provided with a fixed attachment base stem, i.e., threaded base, such that it must be mounted by threading the base stem into a mount. Such a configuration restricts the options for how one might install a prior art light fixture. An improved light fixture would allow for alternative connection mechanisms to be attached to the light fixture to accommodate different environs.

In addition, prior art light fixtures are often mounted on angle mounts that may allow for pivoting of the light fixture about a lateral axis. Such angle mounts tend to be threadingly connected to a fixed base and are not designed for rotational movement. The primary way in which prior art angle mounts could be rotation was to rotate the entire base or loosely connect the angle mount to the base so as to allow for relative turning. Accordingly, there is a need for a light fixture mount that allows not only for full pivoting angle adjustment, but also allows for full rotational angle adjustment. There is also a need for a light fixture mount that allows for both types of movement with a single adjustment tool.

In addition, prior art ground stakes are of such a design that connection of the same to a light fixture generally requires that the light fixture and ground stake be connected before running any electrical wires. Similarly, removal or replacement of a prior art ground stake generally requires that any electrical wires be disconnected or cut. Accordingly, there is a need for a new ground stake design that allows for installation, removal, and replacement of the ground stake all while the electrical wires remain connected.

A new light fixture and ground stake should be versatile in its design and configuration. A new light fixture should provide a design that allows for versatile and alternative mounting configurations and easily provides for pivoting and rotational adjustment of the light fixture. A new ground stake should provide for repair and replacement of the ground stake without the need to cut or remove electrical connections. The present invention fulfills these needs and provides other related advantages.

SUMMARY OF THE INVENTION

The present invention is directed to a multi-axis pivoting and/or rotating knuckle for mounting a light fixture. The invention is preferably used in landscape settings, but has utility in any setting in which light fixtures may be mounted and directed in the environment. The multi-axis pivoting knuckle has a base stem with a toothed neck on an upper end thereof. A base mount has a sleeve on a lower end thereof configured for rotational engagement with the toothed neck. A contact window in the sleeve is configured to partially expose the toothed neck of the base stem therethrough. A brake pad is disposed in the contact window and configured for compression against the toothed neck.

A compression plate is disposed abutting the base mount and configured for compression engagement therewith. During this compression engagement with the base mount, the compression plate is also in compression engagement with the brake pad-particularly compressing the same against the toothed neck. A threaded bolt is provided and configured for pass-through engagement with the compression plate and threaded engagement with the base mount, thereby compressing the compression plate against the base mount.

The multi-axis pivoting knuckle further has an internal passage passing through the base stem and the base mount. The base mount is configured for rotational engagement around a vertical axis of the base stem. A top stem is preferably provided in pivoting engagement with the base mount around a horizontal axis thereof. The base mount has a first annular set of gear teeth arranged around the horizontal axis and the top stem has a second annular set of gear teeth also arranged around the horizontal axis. The first annular set of gear teeth is configured for locking engagement with the second annular set of gear teeth. The threaded bolt is configured for threaded engagement with the compression plate.

The base stem, the base mount, and the top stem each have an internal passage passing therethrough. The top stem also has a threaded neck on an upper end thereof configured for threaded engagement with a light fixture.

The base stem has at least one lug configured for locking engagement with a slotted neck on a light fixture mount, such as a ground stake. The light fixture mount is preferably a ground stake with a surface disc disposed immediately adjacent to the slotted neck. The surface disc and slotted neck each contain matching wire slots to allow for passage of connected wires without cutting or disconnecting the wires.

The slotted neck also has a rotating collar, wherein the rotating collar has a collar wire slot to allow for passage of connected wires when selectively aligned with the matching wire slots on the surface disc and slotted neck. The rotating collar preferably has a notch configured for selective alignment or misalignment with the lug on the base stem.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 8 is a cross-sectional view of a prior art stake mount illustrating the passage of electrical wires there-through;

DETAILED DESCRIPTION OF THE PREFERRED EMBODIMENTS

Figure 1:
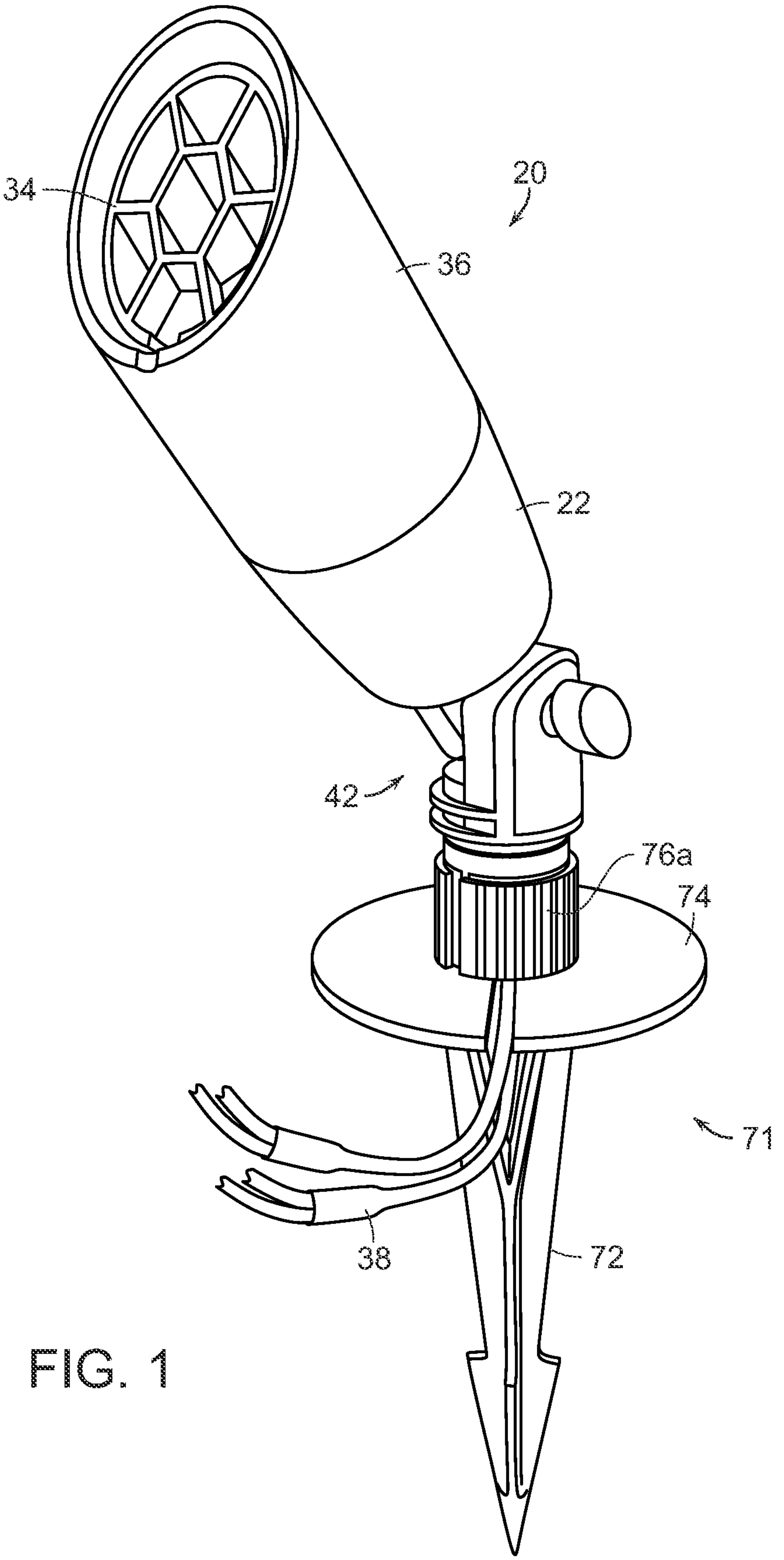
FIG. 1 is a perspective view of an inventive mounted light fixture according to the present invention.
Figure 2:
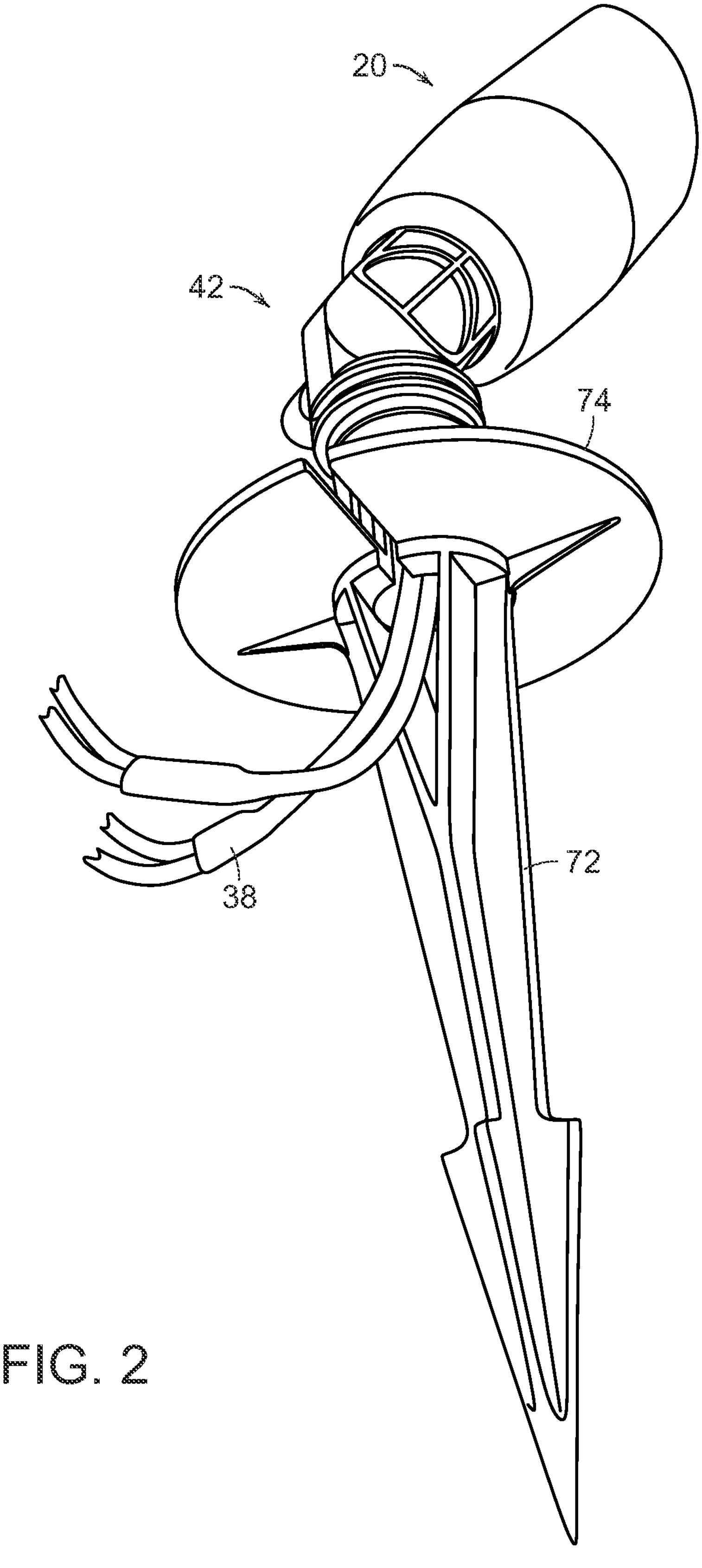
FIG. 2 is lowered perspective view of an inventive mounted light fixture according to the present invention.
Figure 3:
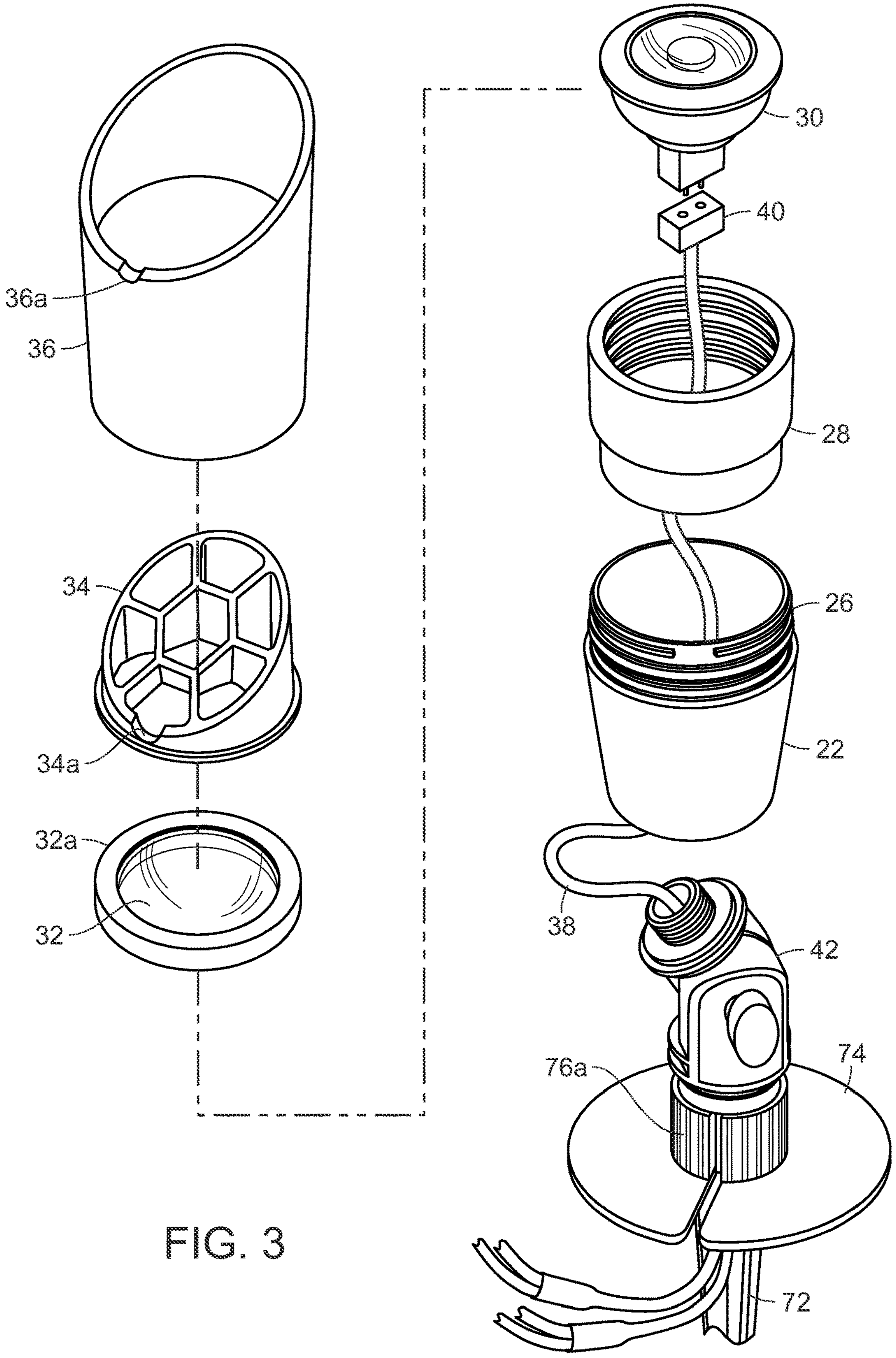
FIG. 3 is an exploded perspective view of an inventive mounted light fixture according to the present invention.

The present invention is directed to a multi-use landscape lighting fixture and mount. In the following detailed description, the landscape lighting fixture will be generally referred to by reference numeral 20. FIGS. 1-3 generally show the landscape lighting fixture 20 mounted on a pivoting knuckle 42 and a quick-load stake 71. The lighting fixture 20 is intended for use in outdoor settings so as to protect against the intrusion of environmental hazards like water or moisture, as by rain, splashing, or hoses.

The fixture 20 comprises a base body 22 having a threaded port 24 (FIG. 15) and a set of quick-connect lugs 26, an internal sleeve 28 for holding a light bulb 30, a lens 32 and gasket 32*a*, a diffusion grate 34 having a drain notch 34*a* in an outer edge thereof, and a top body 36 having drain notch 36*a* and a set of quick-connect channels (not shown) configured to mate with the quick-connect lugs 26. An electrical wire 38 is passed through appropriate openings on the base body 22 and related components to provide an appropriate plug connector 40 for the light bulb 30. When fully assembled and mounted on an appropriate base stem (see below), the base body, lens and gasket 32, and top body 36 provide a sealed environment to isolate the light bulb 30 and plug connector 40 from environmental hazards.

Figure 3A:
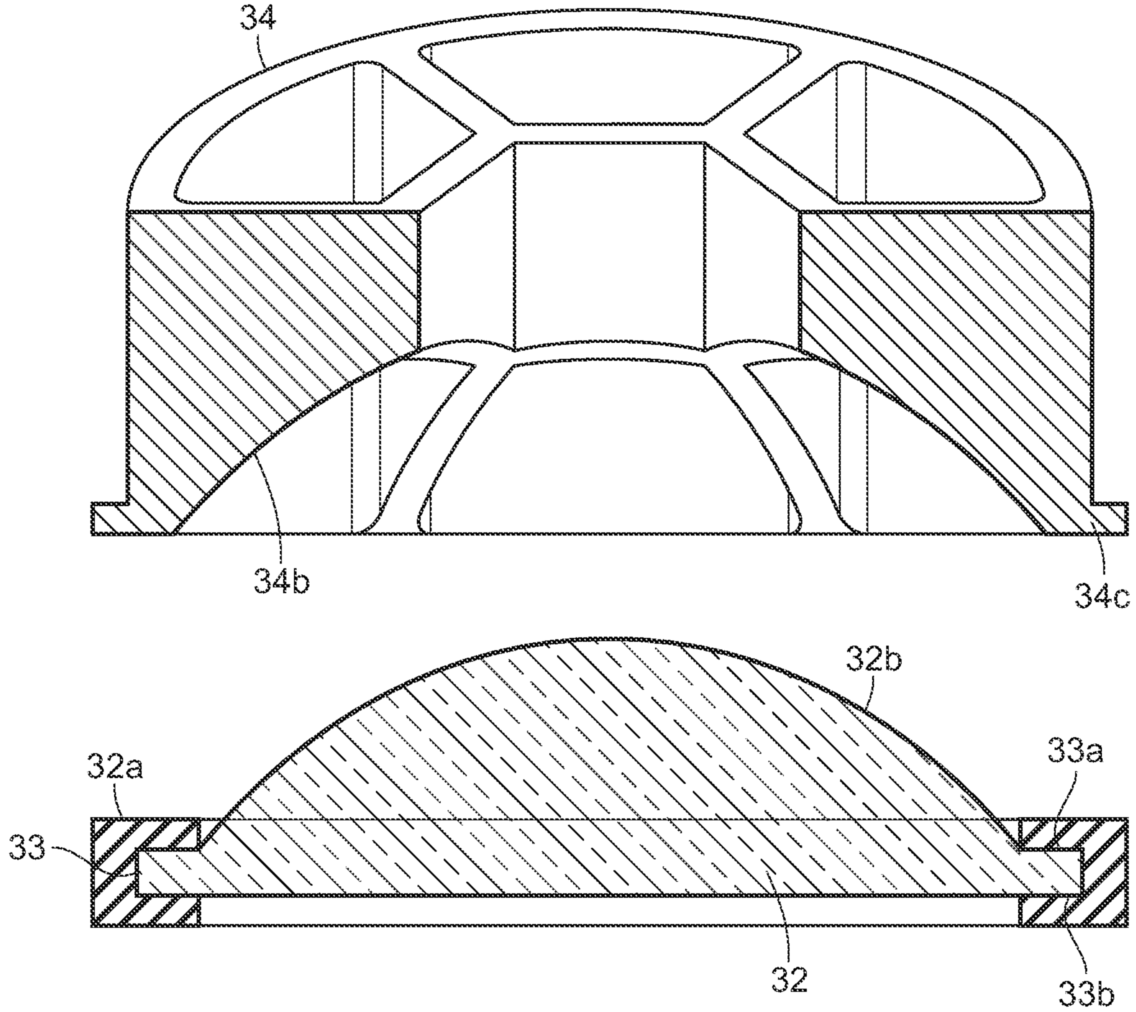
FIG. 3A is a perspective view of an alternate embodiment of the lens of FIG. 3.
Figure 3B:
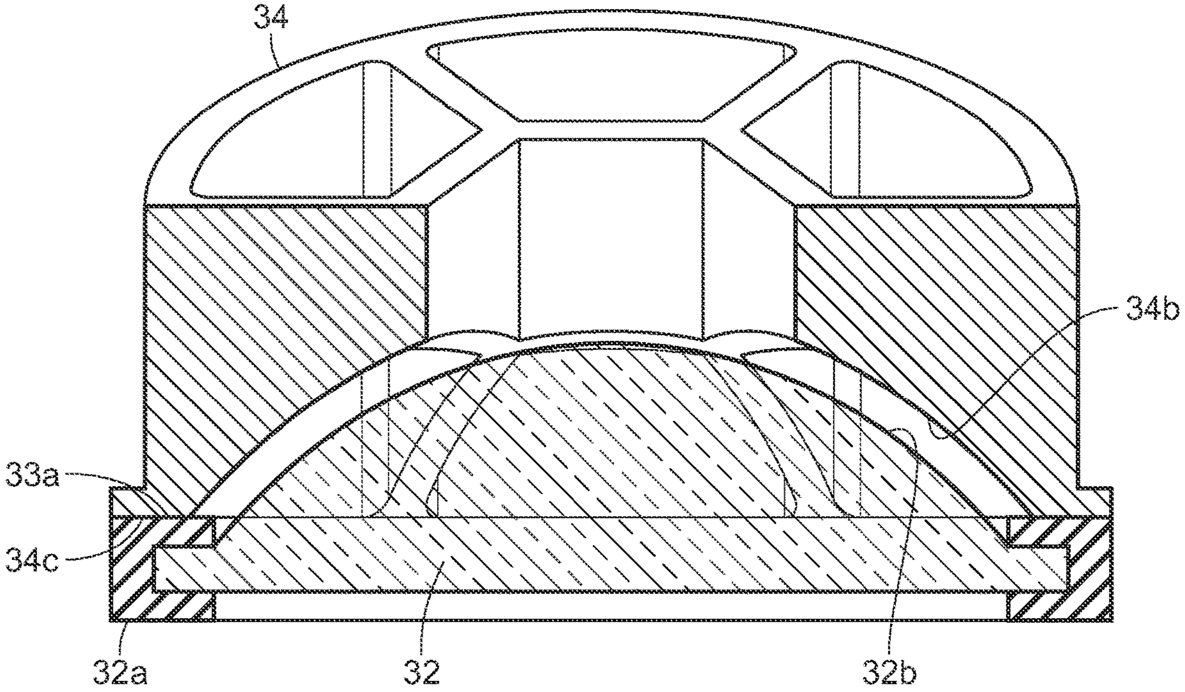
FIG. 3B is a perspective view of an alternate embodiment of the diffusion grate of FIG. 3.

FIG. 3A shows an alternate embodiment of the lens 32 that includes a convex surface 32*b* that protrudes above the plane of the gasket 32*a*. In addition to being disposed around an outer edge 33 of the lens 32, the gasket 32*a* extends across an upper annular surface 33*a* and a lower annular surface 33*b*. The convex surface 32*b* is designed to prevent pooling of water on the surface of the lens 32 when disposed in a landscape environment. FIG. 3B shows an alternate embodiment of the diffusion grate 34 from the underside, illustrating a concave base 34*b* that is configured to match and rest upon the convex surface 32*b* of the lens 32 in FIG. 3A. The diffusion grate 34 also has an annular base 34*c* that surrounds the concave base 34*b*. The annular base 34*c* is configured to engage with and rest on the gasket 32*a* and upper annular surface 33*a*. When the diffusion grate 34 and lens 32 are engaged, the drain notch 34*a* is adjacent to the convex surface 32*b*.

Figure 3C:
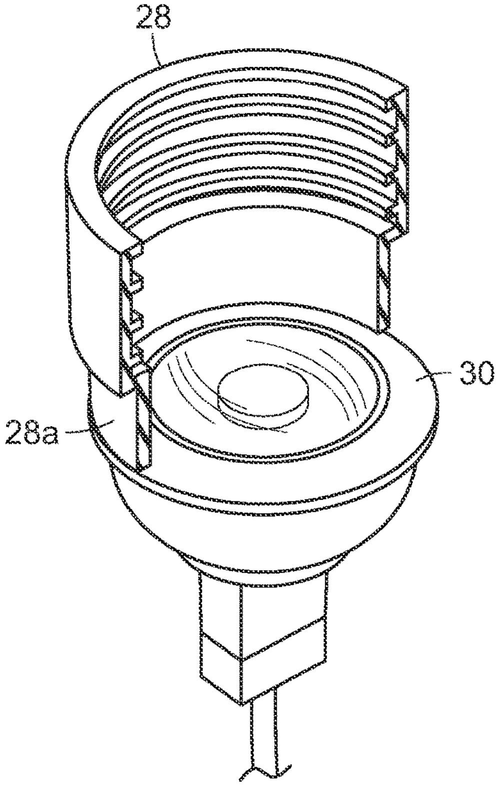
FIG. 3C is a perspective view of a configuration of the internal sleeve and light bulb of FIG. 3.
Figure 3D:
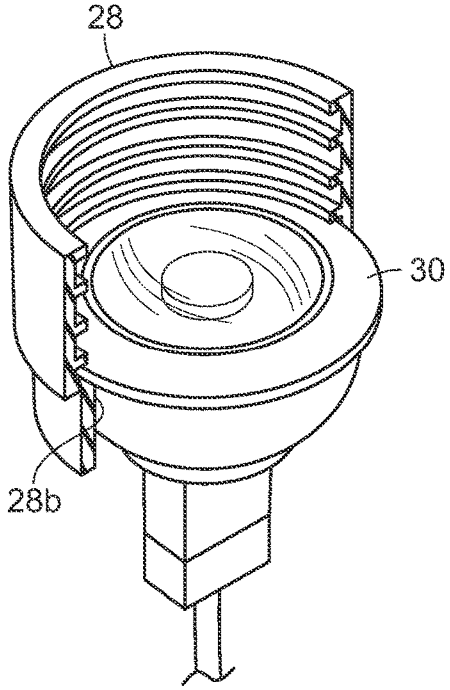
FIG. 3D is a perspective view of an alternate configuration of the internal sleeve and light bulb of FIG. 3.
Figure 3E:
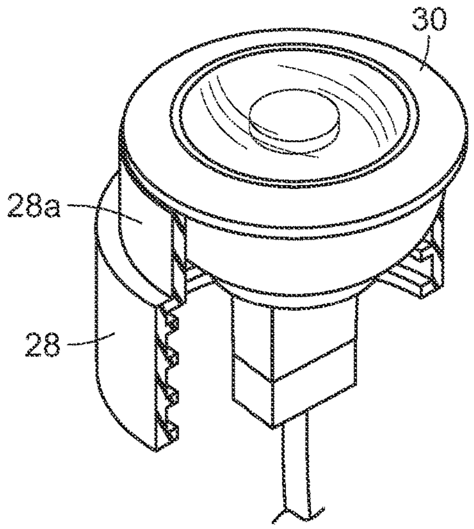
FIG. 3E is a perspective view of an alternate configuration of the internal sleeve and light bulb of FIG. 3.
Figure 4:
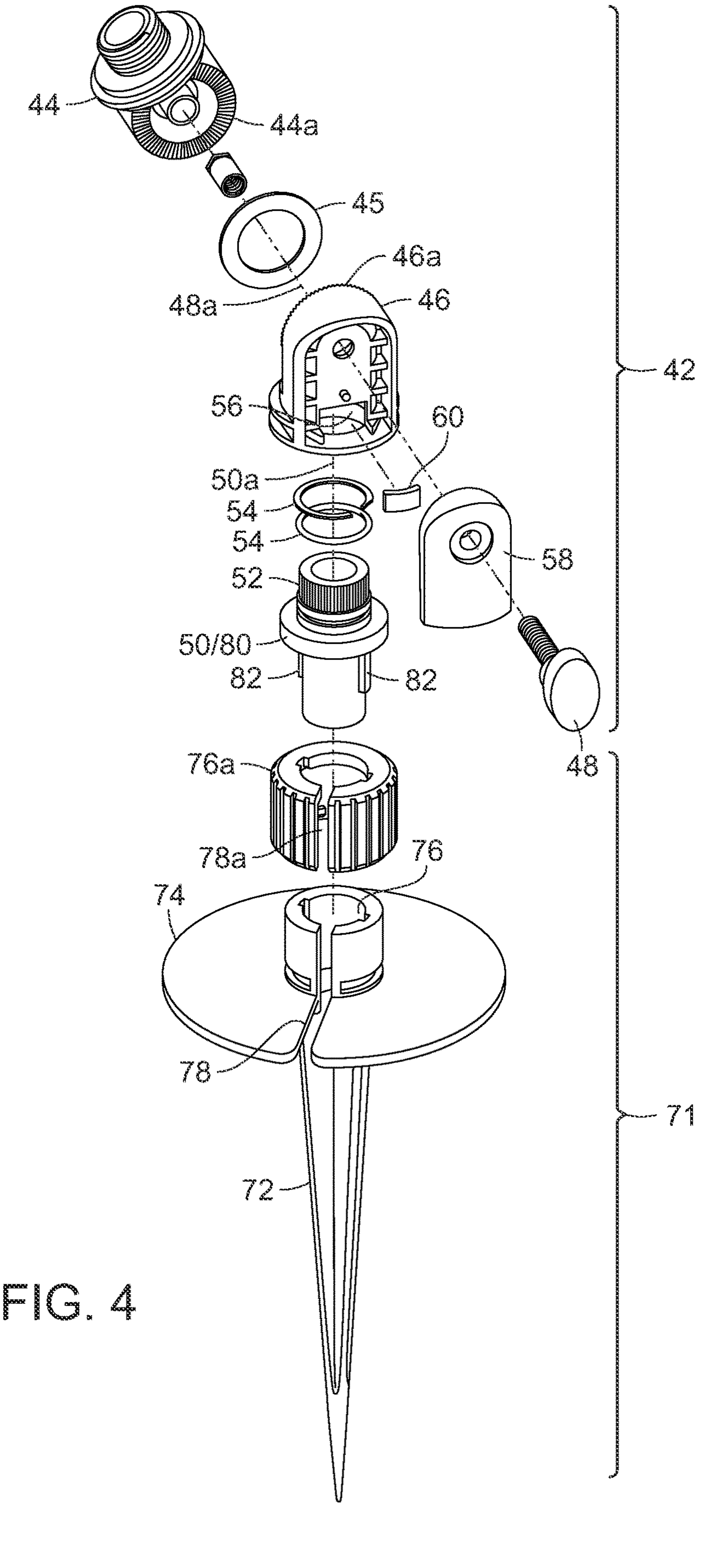
FIG. 4 is an exploded perspective view of an inventive pivoting knuckle and stake mount according to the present invention.
Figure 5:
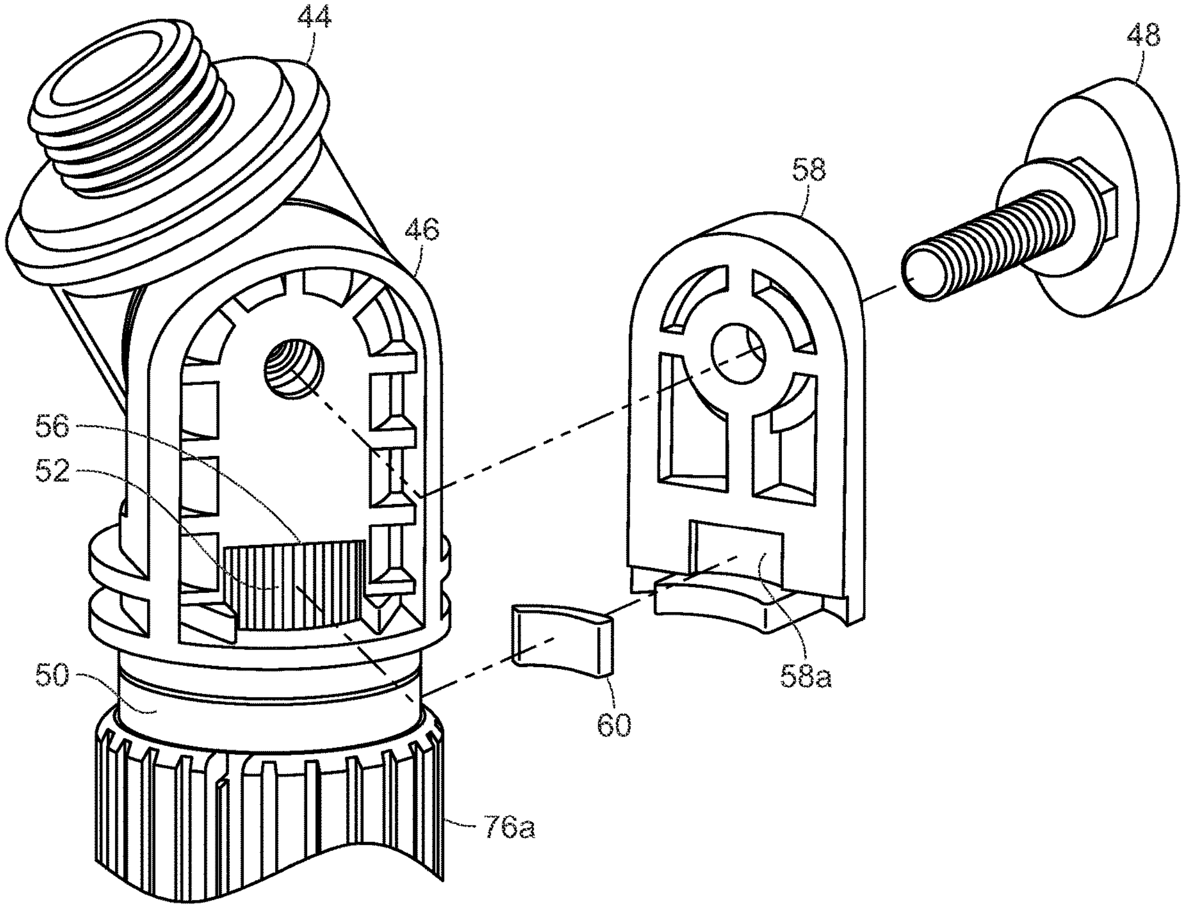
FIG. 5 is a close-up, partially exploded view of an inventive pivoting knuckle according to the present invention.

FIGS. 3C, 3D, and 3E show various configurations of the light bulb 30 relative to the internal sleeve 28 to provide low, middle, and high positions of the light bulb 30 within the fixture 20. In FIG. 3C, the light bulb 30 is disposed beneath a narrow portion 28*a* of the internal sleeve 28, such that the bottom of the narrow portion 28*a* holds the light bulb 30 in a low position down in the base body 22. In FIG. 3D, the light bulb 30 is disposed inside the internal sleeve 28 so that the same rests against an inside shoulder 28*b*, such that the light bulb 30 is held in a middle position within the light fixture 20. In FIG. 3E, the internal sleeve 28 is flipped one-hundred eighty degrees from that of FIGS. 3C and 3D so that the narrow portion 28*a* is oriented upwards. The light bulb 30 rests against the top of the narrow portion 28*a*, such that the light bulb 30 is held in a high position.

The threaded port 24 of the base body is preferably mounted on a multi-axis pivoting knuckle 42 as shown in FIGS. 4-7. The pivoting knuckle 42 preferably provides pivoting adjustment of a mounted light fixture 20 around a lateral axis and rotational adjustment of a mounted light fixture 20 around a vertical axis.

For the pivoting adjustment, the pivoting knuckle 42 comprises a top stem 44 configured to connect to a base mount 46 in a pivoting manner by a threaded bolt 48 providing a lateral axis of rotation 48*a*. The top stem 44 has a set of gear teeth 44*a* configured to engage a set of gear teeth 46*a* on the base mount 46. As the threaded bolt 48 is tightened, the sets of gear teeth 44*a*, 46*a* will more strongly engage each other. The knuckle 42 may also include a soft washer 45 between the sets of gear teeth 44*a*, 46*a* to increase the engaging strength. When the threaded bolt 48 is sufficiently loosened, the top stem 44 may pivot around the horizontal axis 48*a* relative to the base mount 46 in a range, preferably from zero degrees to one-hundred eighty degrees.

For the rotational adjustment, the pivoting knuckle 42 comprises the base mount 46 rotatably mounted on a base stem 50 about a vertical axis 50*a*. The base stem 50 has a toothed neck 52 that extends into a cavity (not shown) in the bottom of the base mount 46. One or more washers 54 may be included between the base mount 46 and the base stem 50. When the base mount 46 is mounted on the base stem 50, the toothed neck 52 is partially exposed through a window 56 in the side of the base mount 46. A face plate 58 is mounted on the side of base mount 46 and held in place by the threaded bolt 48. A portion of the face plate 58 covers the window 56 and has a recess 58*a* to hold a rubber brake pad 60 or similar material in place in the window 56 and against the toothed neck 52. With the threaded bolt 48 is sufficiently tightened to hold the face plate 58 against the base mount 46, the rubber pad 60 is compressed against the toothed neck 52 and restricts the rotation of the base mount 46 relative to the base stem 50. When the threaded bolt 48 is loosened, the face plate 58 retracts from the base mount 46 and the rubber pad 60 releases the toothed neck 52 so that the base mount 46 may be rotated around the vertical axis 50*a* relative to the base stem 50.

Figure 6:
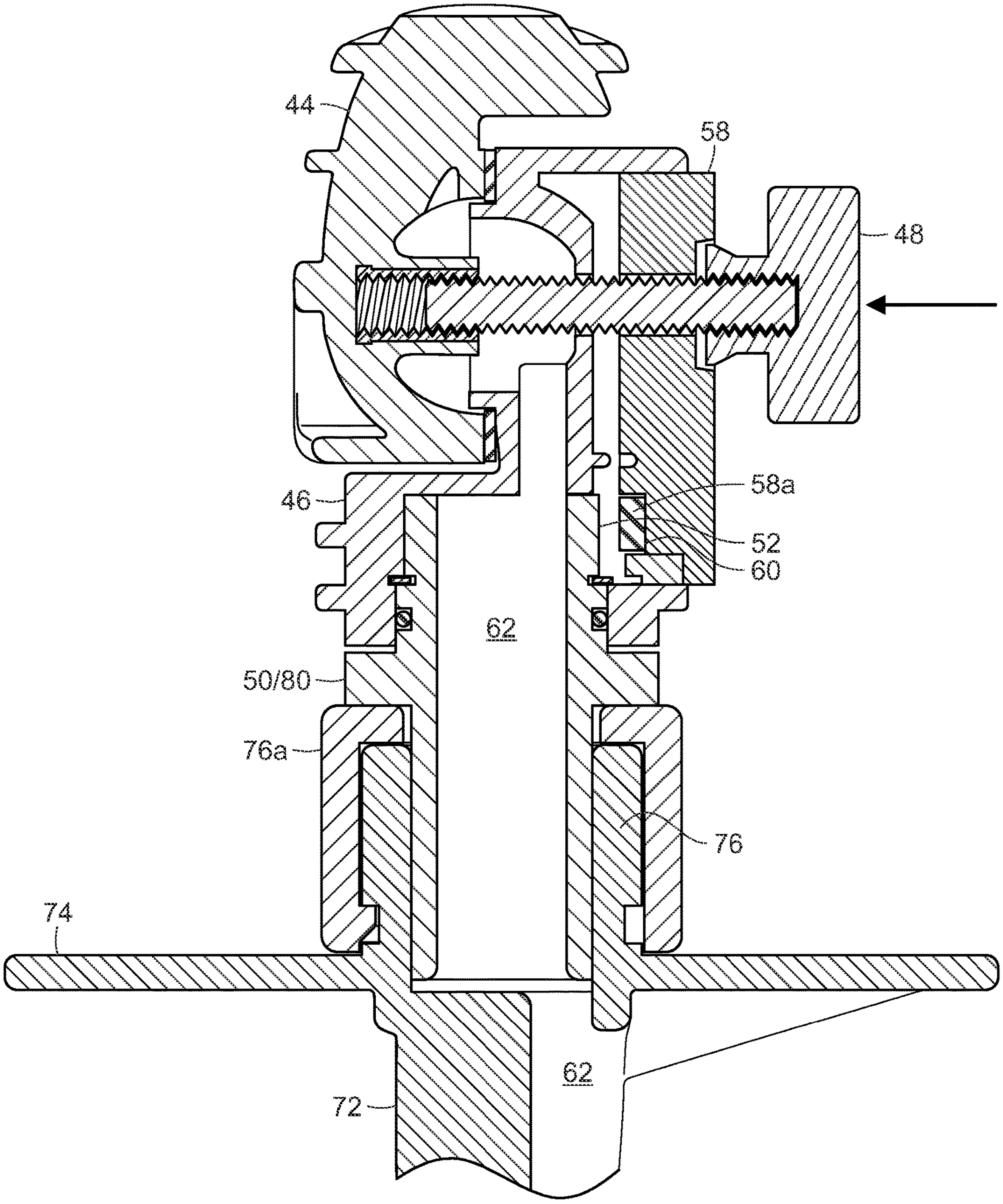
FIG. 6 is a cross-sectional view of an inventive pivoting knuckle and stake mount according to the present invention.
Figure 7:
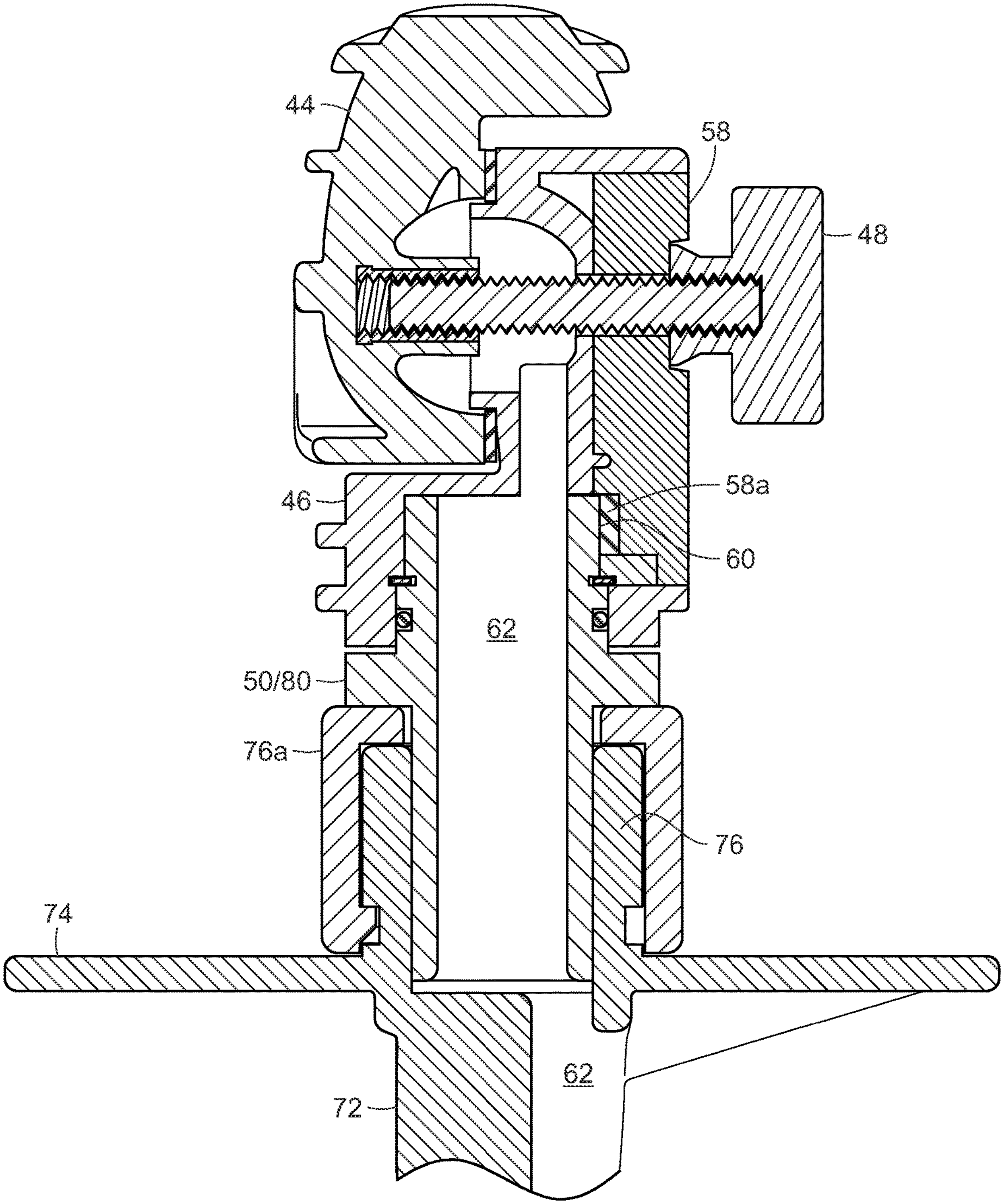
FIG. 7 is a cross-sectional view of an inventive pivoting knuckle and stake mount according to the present invention.

As shown in FIG. 6, the loosening of the threaded bolt 48 simultaneously permits both pivoting adjustment (by releasing the sets of gear teeth 44*a*, 46*a*) and rotational adjustment (by releasing the rubber pad 60 from the toothed neck 52) of the pivoting knuckle 42. As shown in FIG. 7, the tightening of the threaded bolt 48 simultaneously restricts both pivoting adjustment and rotational adjustment of the pivoting knuckle 42. All of the body portions in the pivoting knuckle 42—the top stem 44, the base mount 46, and the base stem 50—include internal passageways 62 that allow for the passage of electrical wires through the pivoting knuckle 42.

Figure 8:
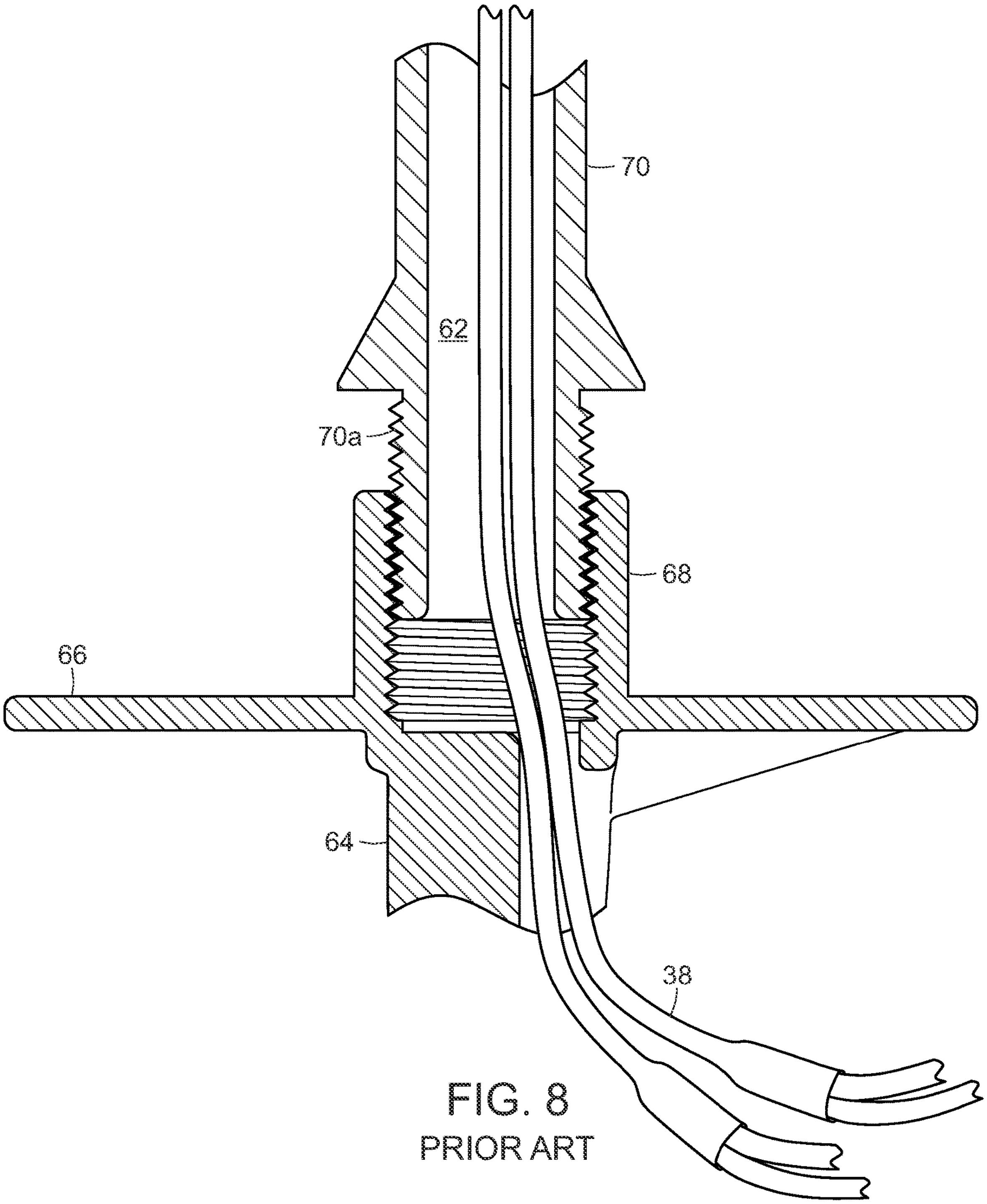
FIG. 8 PRIOR ART

FIG. 8 illustrates a prior art method for connecting a light fixture to a ground stake. As shown in partial, cross-section view in FIG. 8, a prior art connection includes a ground stake 64 having a surface disc 66 and a threaded neck port 68. A base stem 70 having a threaded body 70*a* is connected to the threaded neck port 68 on the ground stake 64 with internal passageways 62 there through. While this view is shown in cross-section, the parts of the ground stake 64 are completely enclosed such that assembly requires that the base stem 70 be connected to the neck port 68 before any electrical wires are run through the internal passageways 62. This also means that removing the base stem 70 of a light fixture from the ground stake 64 requires disconnecting electrical wires 38.

Figure 9:
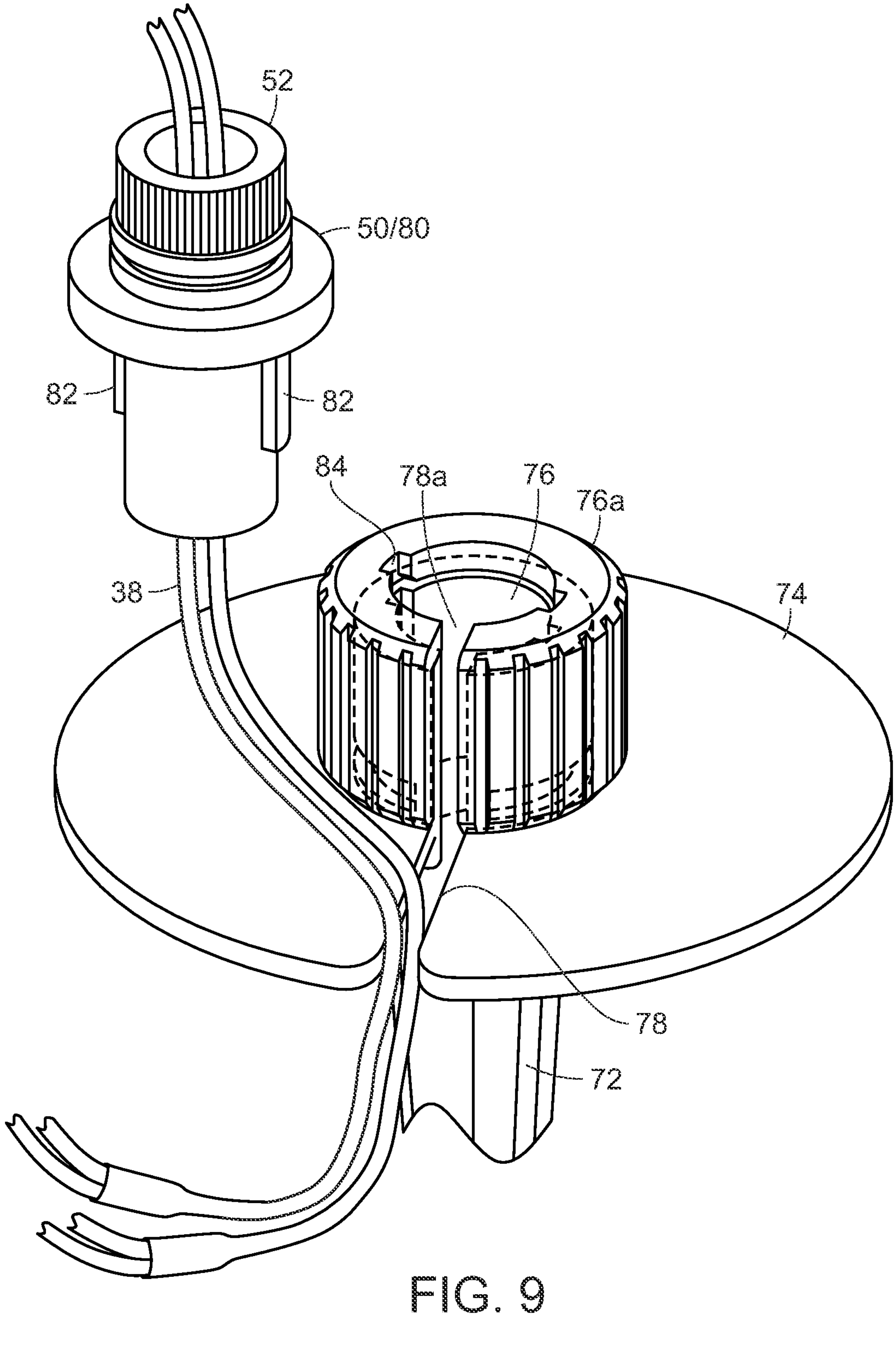
FIG. 9 is a close-up, perspective view of a step in connecting a light fixture to an inventive stake mount according to the present invention.
Figure 10:
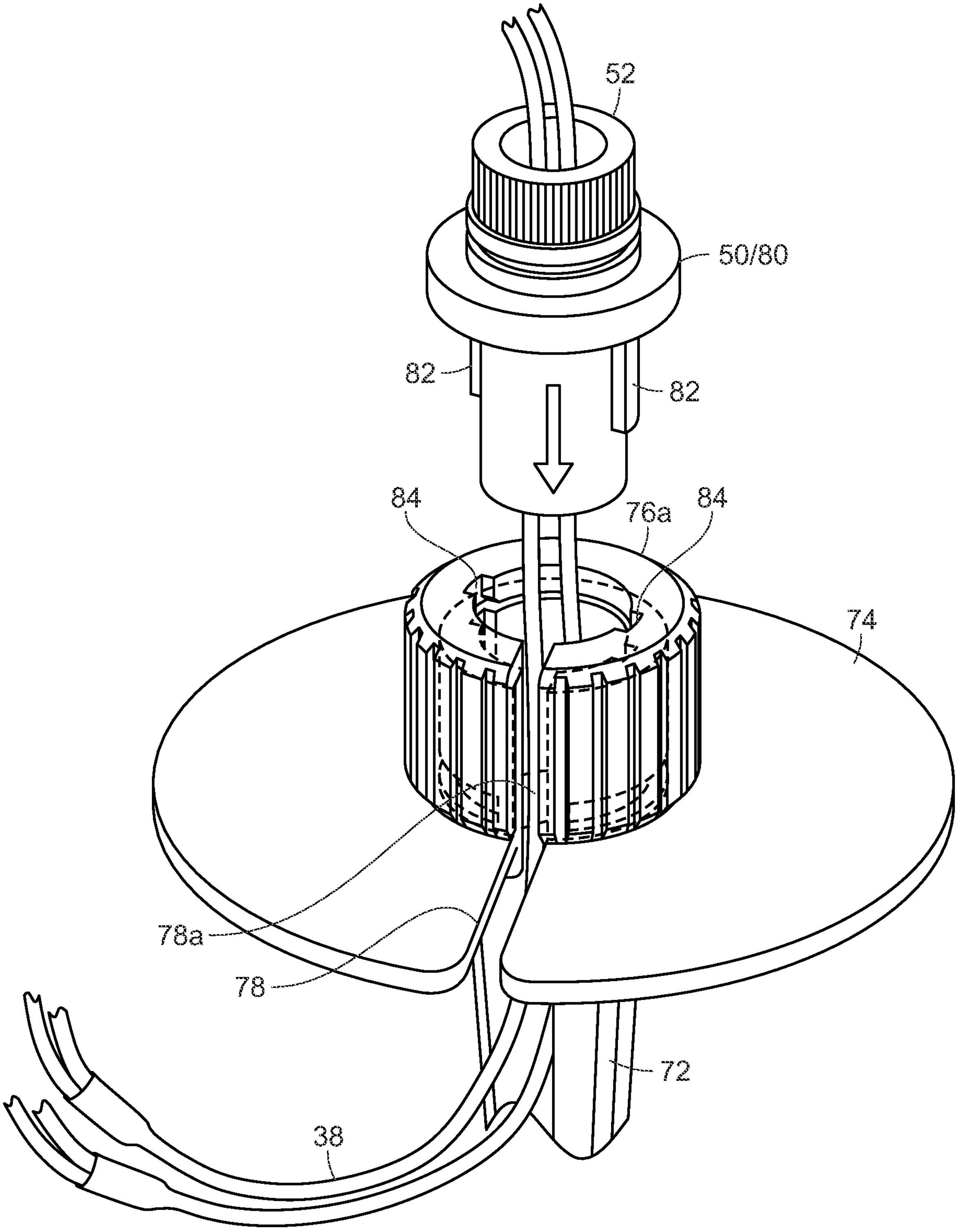
FIG. 10 is a close-up, perspective view of another step in connecting a light fixture to an inventive stake mount according to the present invention.
Figure 11:
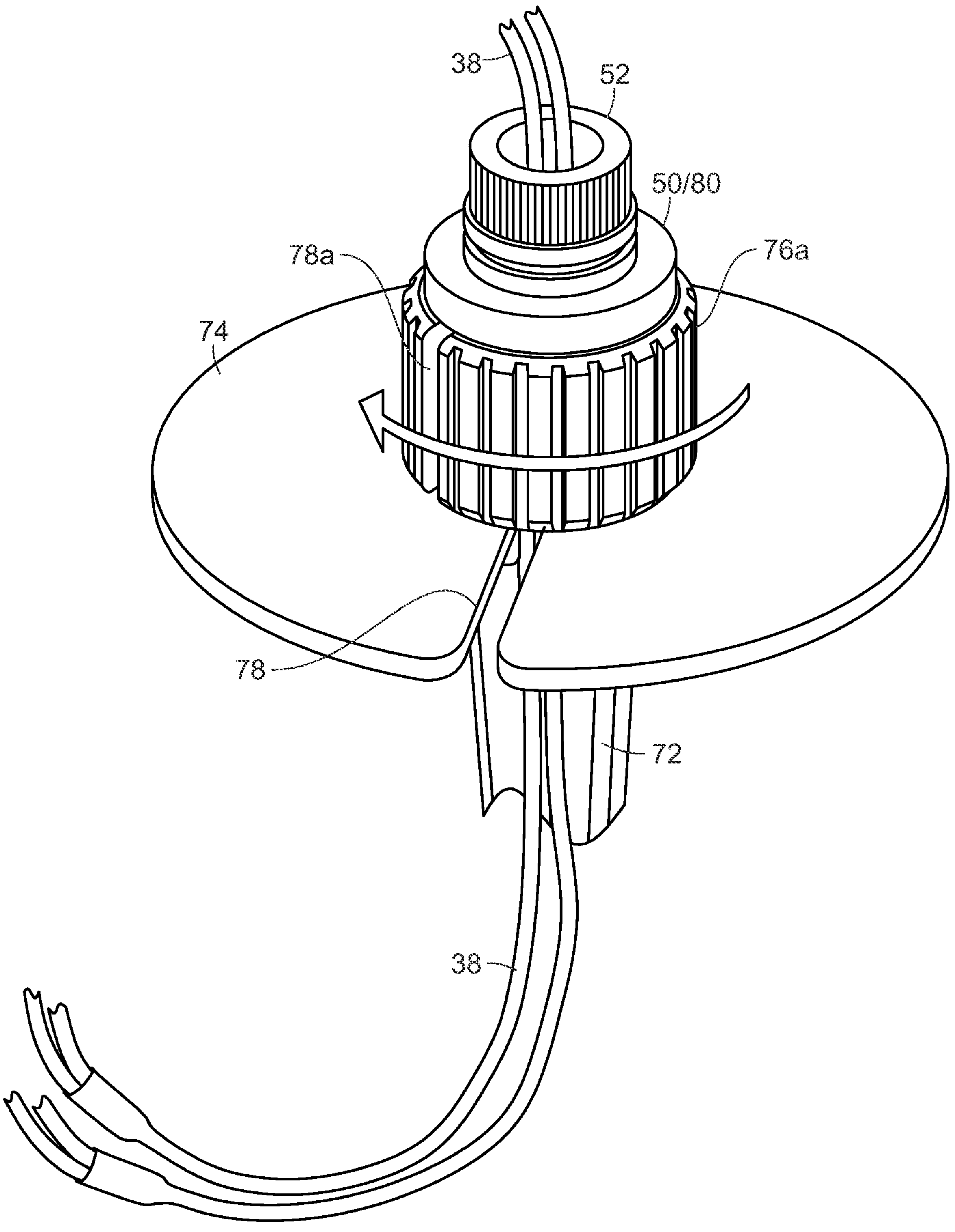
FIG. 11 is a close-up, perspective view of another step in connecting a light fixture to an inventive stake mount according to the present invention.

The inventive ground stake 71 shown in FIGS. 9-11 (and otherwise in FIGS. 1-4) provides a mechanism whereby the ground stake 71 can be repaired or replaced without having to disconnect any electrical wires. Similar to the prior art device, the inventive ground stake 71 includes a stake 72, a surface disc 74, and a neck port 76. The inventive ground stake 71 also includes a wire slot 78 through the surface disc 74 and the neck port 76 that opens into the inner passageway 62 in the ground stake 71. A rotating collar 76*a* is included on the neck port 76 having another wire slot 78*a* that, when aligned with the wire slot 78 on the surface disc 74 and neck port 76, allows access to the internal passageway 62.

In this manner, a base stem 80 on a light fixture with electrical wires 38 connected to an electrical source can be more easily connected to the ground stake 71. As shown in FIG. 9, the electrical wires 38 may be passed through the wire slots 78, 78*a* and into the internal passageway 62. As shown in FIG. 10, the base stem 80 having one or more lugs 82 can then be inserted into the neck port 76 such that the lugs 82 are aligned with channels 84 on both the neck port 76 and collar 76*a*. Once the base stem 80 is inserted into the neck port 76, the collar 76*a* is rotated so as to misalign the wire slot 78*a* on the collar 76*a* from the wire slot 78 on the neck port 76. As shown in FIG. 11, rotating the collar also misaligns the channels 84 on the neck port 76 and collar 76*a*. In this way, the base stem 80 is locked into place on the neck port 76 and the electrical wires 38 are passed through the internal passageways 62.

If the ground stake 71 needs to be replaced or repaired for any reason, the base stem 80 and electrical wires 38 can be removed by performing the above steps in the reverse order without the need to break or cut any electrical connections. As shown in FIGS. 1 and 2, the electrical wires 38 are accessible through an opening in the bottom of the ground stake 71.

Figure 12:
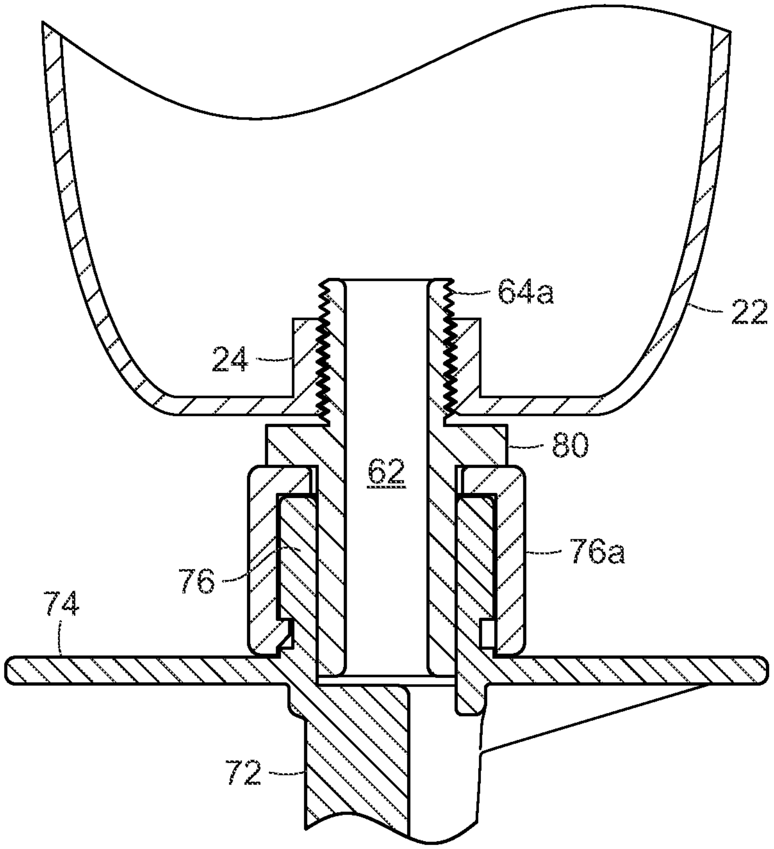
FIG. 12 is a close-up, cross-sectional view of a light fixture mounted on an inventive stake mount according to the present invention.
Figure 13:
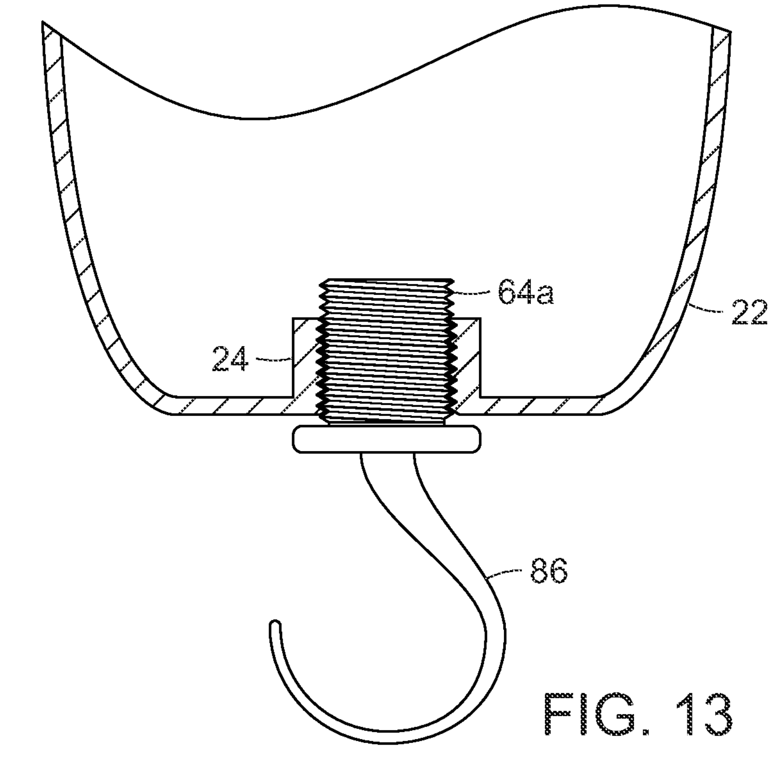
FIG. 13 is a close-up, cross-sectional view of a light fixture on a hook mount according to the present invention.
Figure 14:
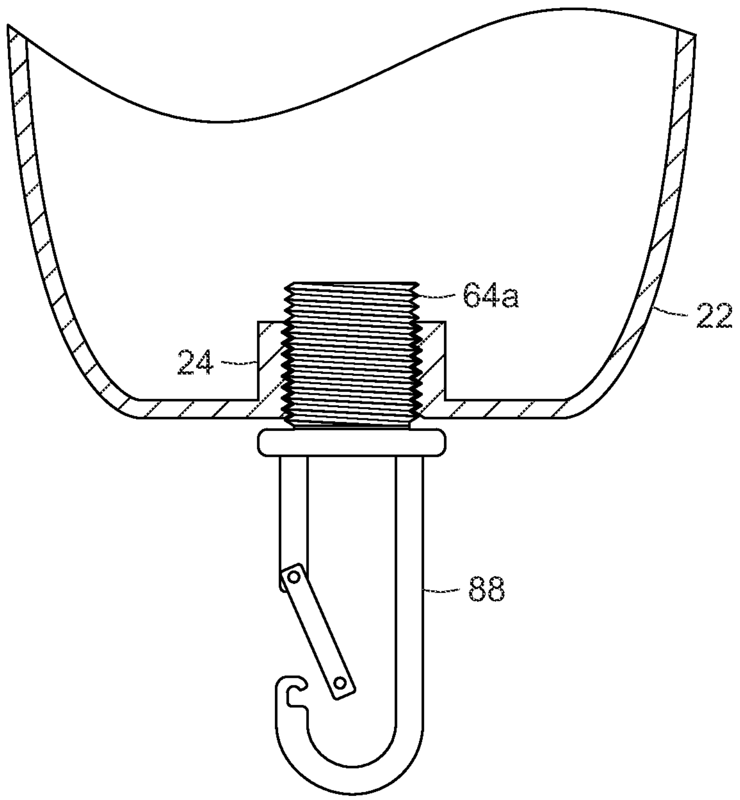
FIG. 14 is a close-up, cross-sectional view of a light fixture on a carabiner mount according to the present invention.
Figure 15:
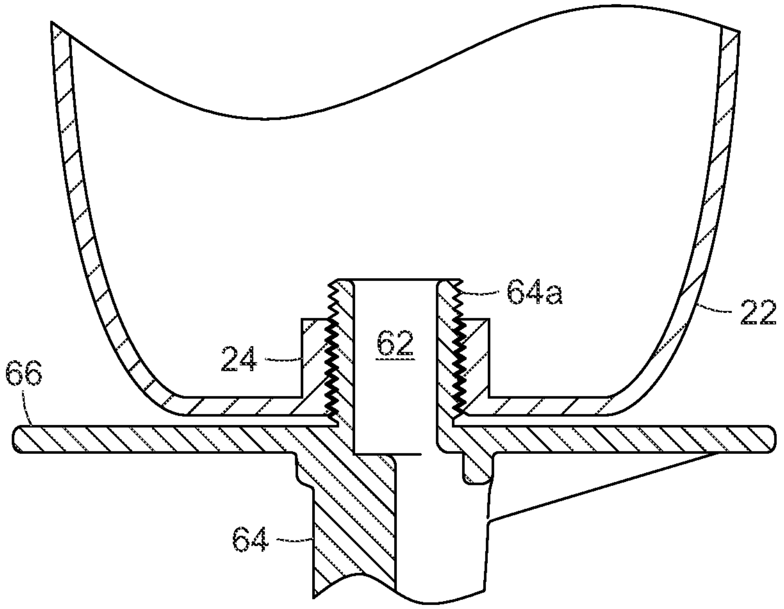
FIG. 15 is a close-up, cross-sectional view of a light fixture on a threaded stake mount according to the present invention.

FIGS. 12-15 illustrate alternative designs for connection between a light fixture 20 and a mounting structure. FIG. 12 shows the connection of the base body 22 of a light fixture 20 to a base stem 80 and ground stake 72 as described in the preceding paragraphs. Alternatively, FIG. 13 shows the base body 22 of a light fixture 20 threadingly connected to a basic hook 86 for connection to a wire, eyelet, or similar structure. FIG. 14 shows the base body 22 of a light fixture 20 threadingly connected to a carabiner 88 for similar connection to a wire, eyelet, or similar structure. FIG. 15 shows the base body 22 of a light fixture 20 threadingly connected directly to a prior art ground stake 64 having a threaded neck stem 64*a*.

Figure 16:
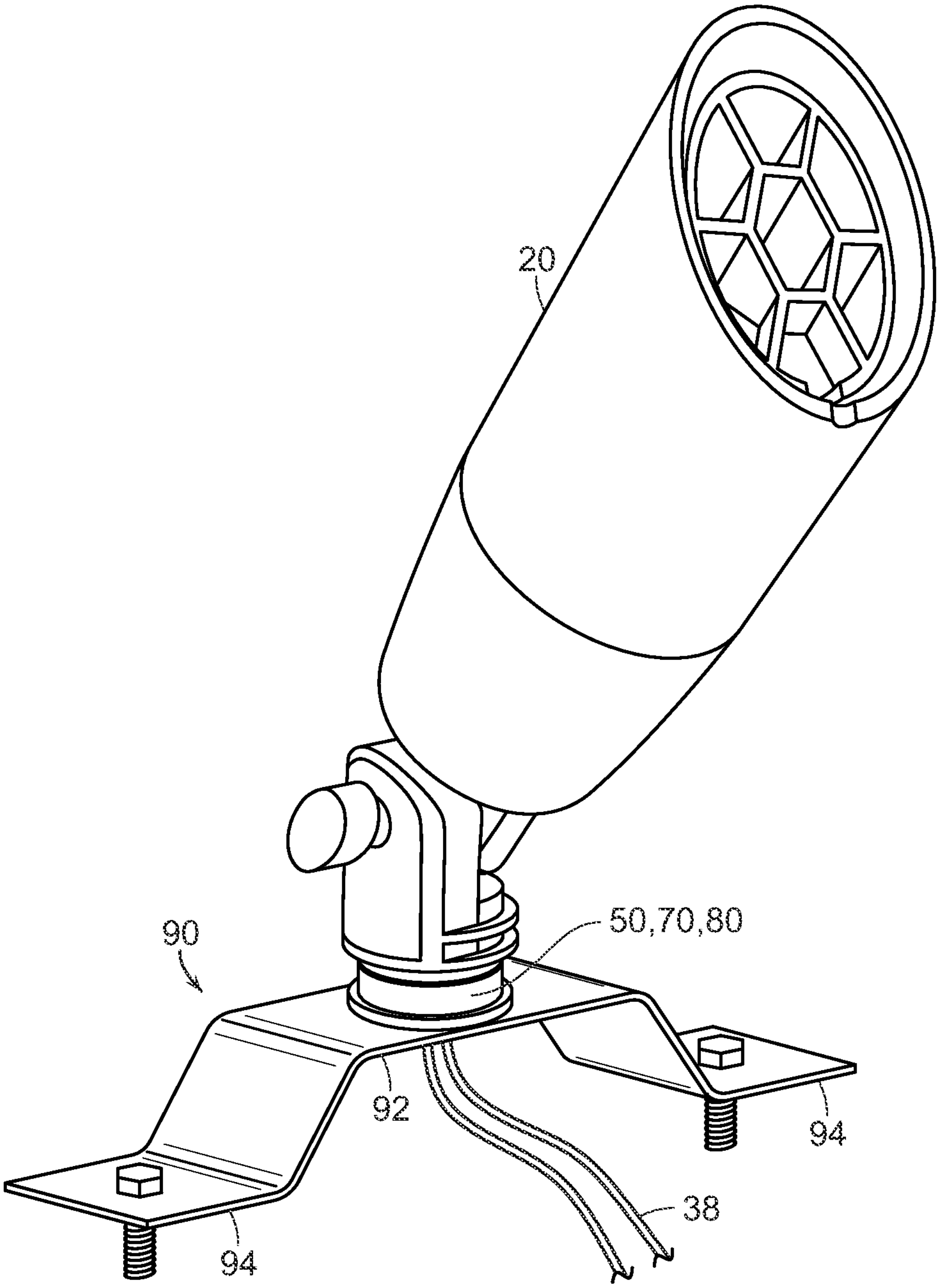
FIG. 16 is a perspective view of a light fixture on a tree mount bracket.

FIG. 16 illustrates a light fixture 20 attached to a tree mount bracket 90. The bracket 90 has a base plate 92 configured to receive a base stem 50, 70, 80 from a light fixture 20. The base plate 92 is connected to and raised above at least one, but preferably two, angled feet 94 configured for being fastened as by screws or bolts to a surface such as a tree. The raised base plate 92 provides clearance between the bracket 90 and the underlying surface for wires or other connections to the light fixture 20.

Figure 16A:
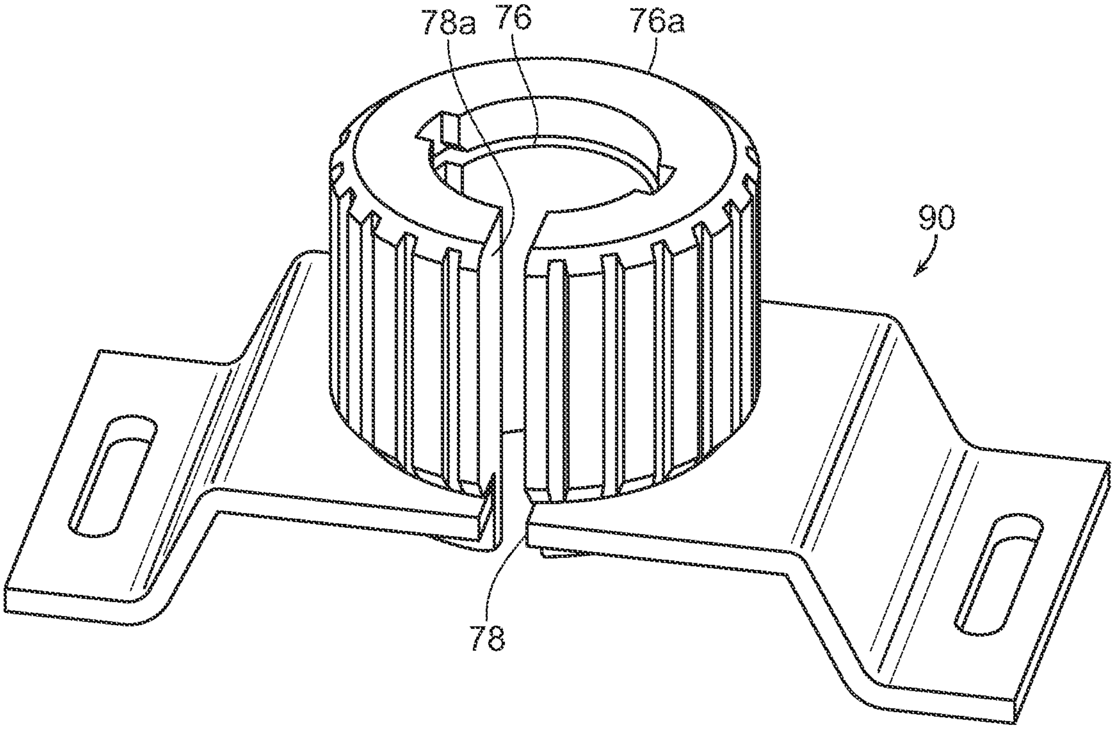
FIG. 16A is a perspective view of an alternate embodiment of the tree mount bracket of FIG. 16.

FIG. 16A illustrates an alternate embodiment of the tree mount bracket 90. Specifically, the base stem 50, 70, 80 has been replaced by a neck port 76 and rotating collar 76*a* similar to the lighting stake 71 as shown and described in FIGS. 9-11. The neck port 76, rotating collar 76*a*, and the bracket 90 also include a wire slot 78, 78*a* for receiving a light fixture 20 and wires 38 similar to the process described in connection with FIGS. 9-11. This configuration allows for a light fixture 20 and wires 28 to be removed/replaced without cutting or disconnecting any wires or removing the bracket 90 from a surface.

Figure 17:
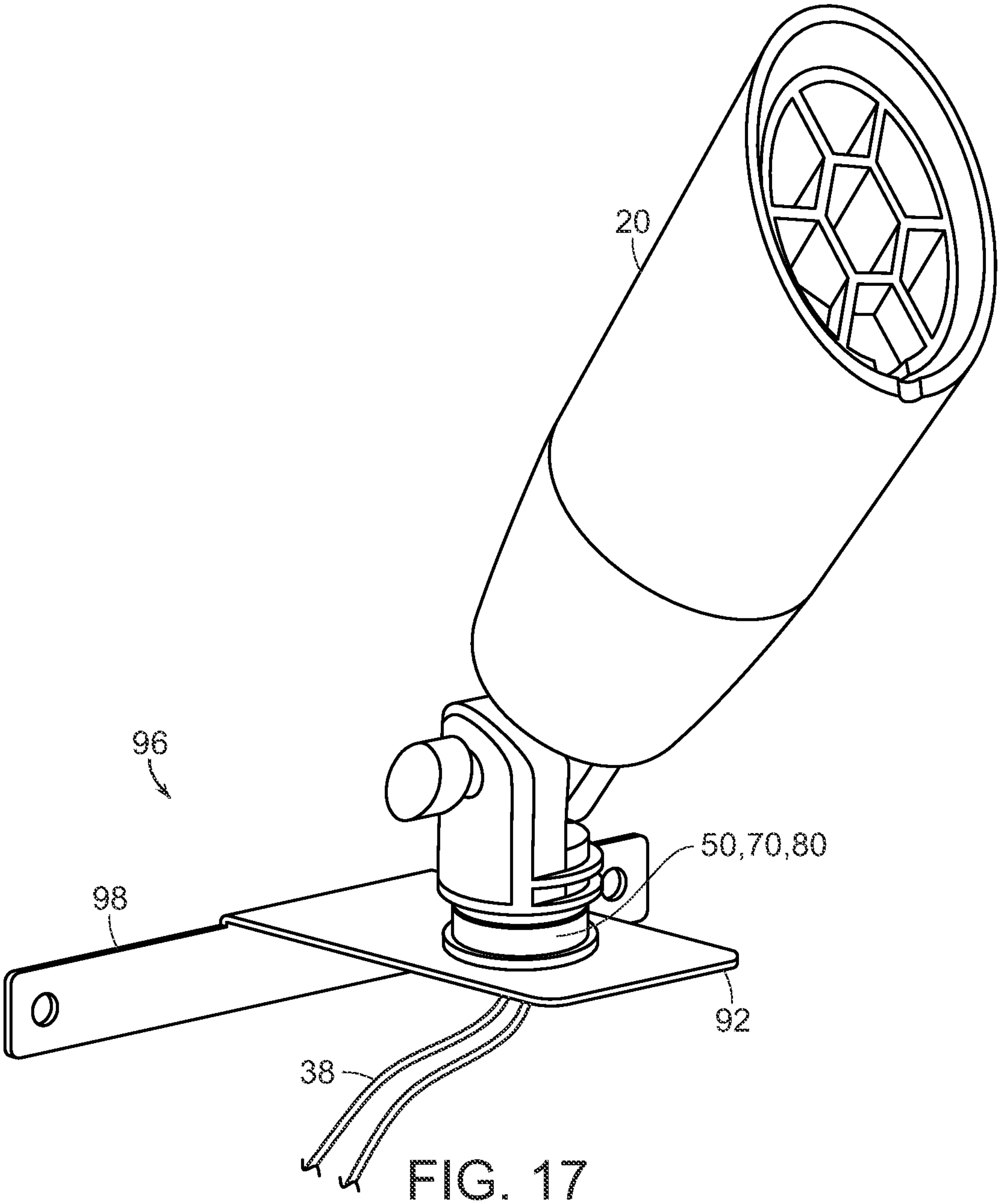
FIG. 17 is a perspective view of a light fixture on a gutter mount bracket.

FIG. 17 illustrates a light fixture 20 attached to a gutter mount 96. The gutter mount 96 also has a base plate 92 configured to receive a base stem 50, 70, 80 from a light fixture 20. The base plate 92 is connected along one side to a side plate 98 configured for attachment to a gutter, an eave or similar structure on a building. The orientation of the base plate 92 relative to the side plate 98 provides clearance the bracket 96 and the underlying surface for wires or other connections to the light fixture 20.

Figure 17A:
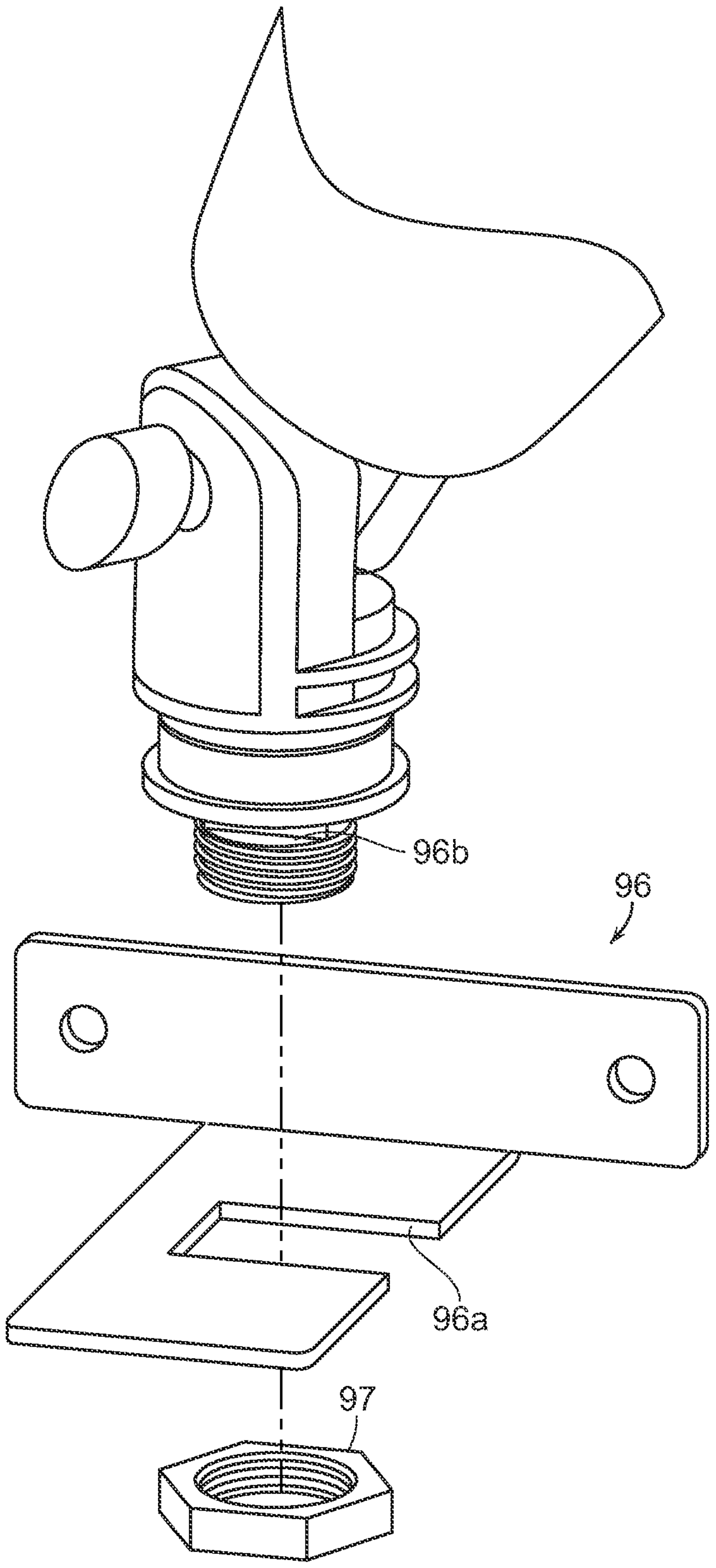
FIG. 17A is a perspective view of an alternate embodiment of the gutter mount bracket of FIG. 17.

FIG. 17*a* illustrates an alternate embodiment of the gutter mount bracket 96. The bracket 96 includes a slot 96*a* for receiving a base stem 50, 70, 80. The slot 96*a* has an opening to the edge of the bracket 96 so that the light fixture 20 and base stem 50, 70, 80 can be attached to the bracket 96 without cutting or disconnecting wires 38. Preferably, the slot 96*a* has a square or rectangular cross-section and the stem 50, 70, 80 has a matching square or rectangular cross-section 96*b* in at least one direction so that the stem 50, 70, 80 will not rotate relative to the bracket 96 when inserted into the slot 96*a*. A tightening nut 97 can be attached to the stem 50, 70, 80 to hold it in place on the bracket 96.

Figure 18:
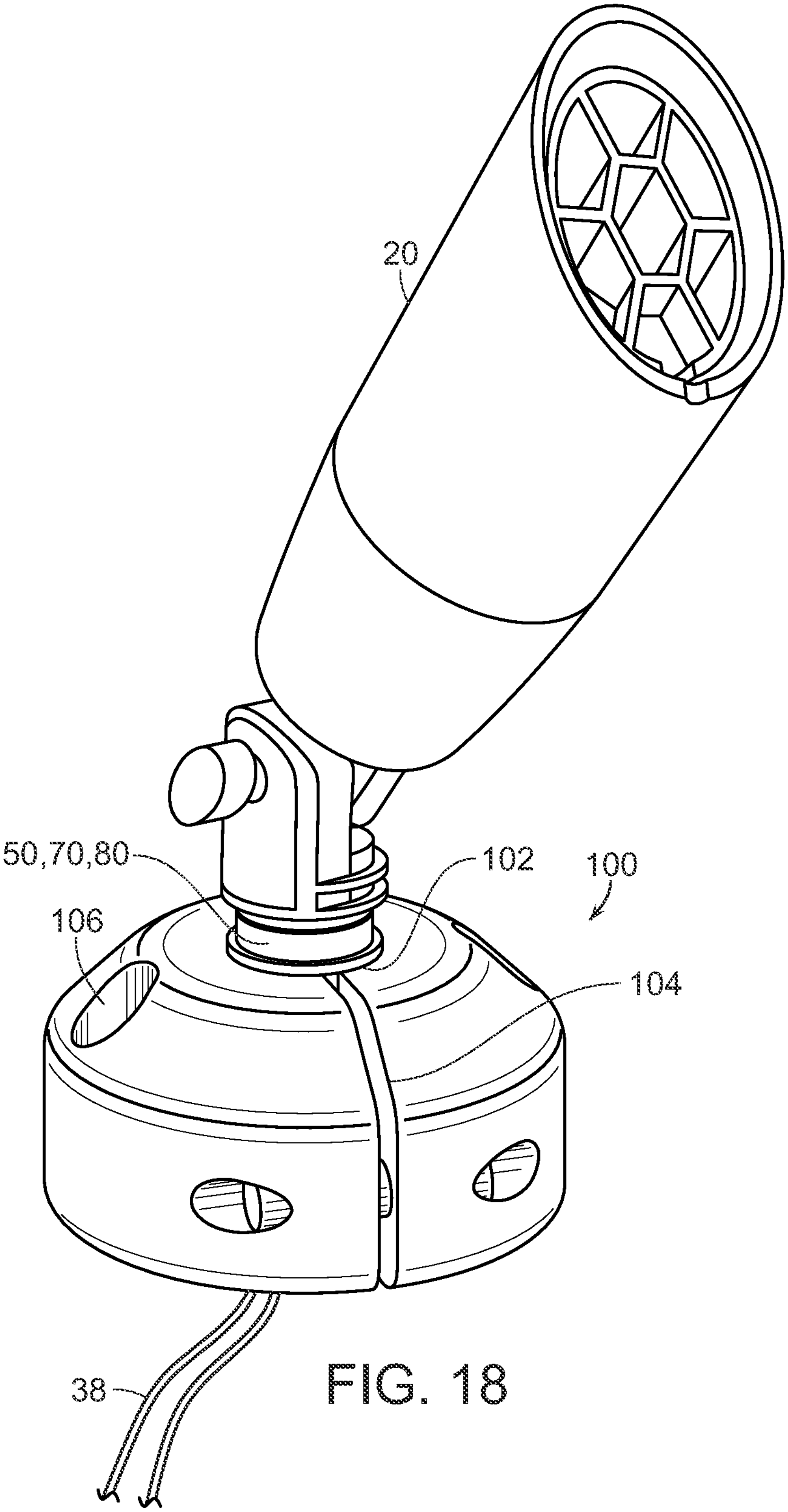
FIG. 18 is a perspective view of a light fixture on a dome base mount.

FIG. 18 is an illustration of a light fixture 20 attached to a dome base mount 100. The dome base mount 100 is configured in a general annular form having a central port 102 and a split opening 104 through a part of the annulus. The split opening 104 allows for a slight contraction of the central port 102 when the split opening 104 is closed as by a bolt or screw. The central port 102 is designed to accommodate a stem 50, 70, 80 from a light fixture 20 and securely hold the same when the split opening 104 is closed. The dome base mount 100 may be secured to virtually any surface by bolts or screws through mounting holes 106. The surface is preferably prepared for passage of electrical wires 38 as by a drilled hole (not shown) or similar opening.

Figure 18A:
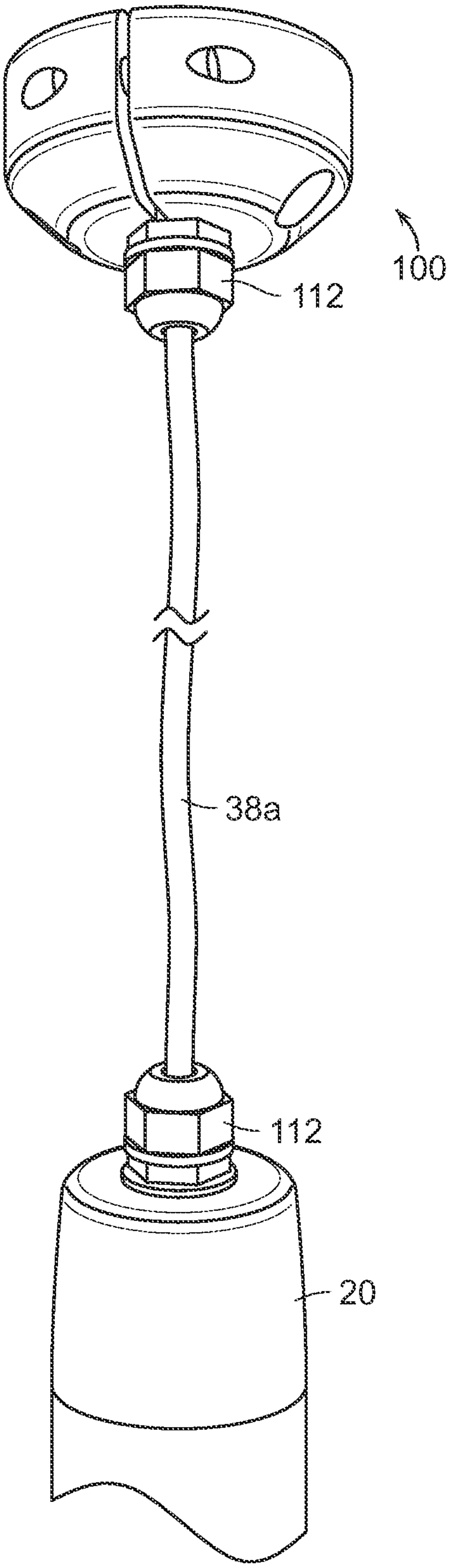
FIG. 18A is a perspective view of an alternate embodiment of a light fixture on a dome base mount.

FIG. 18A illustrates and alternate embodiment of the dome base mount 100 wherein the same is mounted on a surface such that the light fixture 20 can hang upside down from the mount 100. The light fixture 20 may be attached to the mount 100 by a base stem 50, 70, 80 as described above. Alternatively, the light fixture 20 can be connected by electrical wires 38*a* extending from a fixed coupling 112.

In each of the fixtures shown in FIGS. 16-18*a*, the stems 50, 70, 80 can be configured to interface with a neck port 76 having collar 76*a* and channels 84 such that lugs 82 on the stem 50, 70, 80 are locked into place once collar 76*a* is rotated out of alignment, as described above. Also, as described above, the stems 50, 70, 80 may be configured to receive a tightening nut to secure the stem 50, 70, 80 in place.

Figure 19:
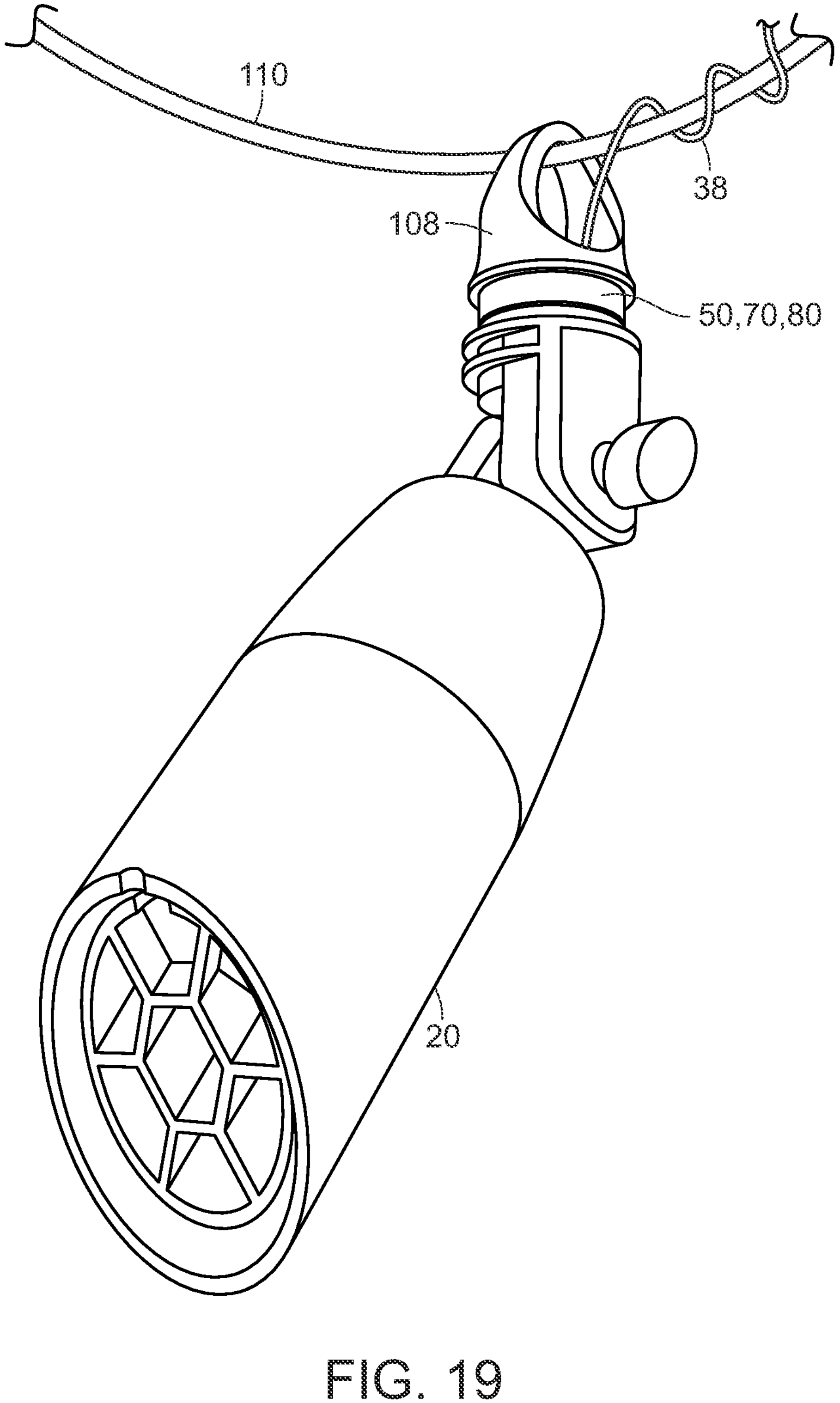
FIG. 19 is an environmental view of a light fixture with a closed loop mount on a hanging wire.

FIG. 19 illustrates a light fixture 20 attached to a closed loop mount 108 attached to a mount wire 110 or similar structure. The mount wire 110 typically spans an open gap between two opposing surfaces (not shown). Electrical wires 38 may also be attached to the mount wire 110 as a mean of providing electricity to the light fixture 20 in the middle of the open gap. Alternatively, the closed loop mount 108 may simply be hung from a chain or hook (not shown) or similar structure from an elevated surface.

Although several embodiments have been described in detail for purposes of illustration, various modifications may be made without departing from the scope and spirit of the invention. Accordingly, the invention is not to be limited, except as by the appended claims.

What is claimed is:

1. A lens and diffusion grate combination for a light fixture including a lens disposed adjacent to a light source in a light fixture housing; and a diffusion grate disposed adjacent to the lens opposite the light source, characterized in that:

a gasket is disposed around an outer edge of the lens;

the lens has a convex surface that protrudes above a plane of the gasket in a direction away from the light source;

the diffusion grate has a concave base that corresponds to and is configured to engage the convex surface of the lens; and a drain notch disposed on an outer edge of the diffusion grate that is adjacent to the convex surface when the concave base engages with the convex surface.

2. The lens and diffusion grate combination of claim 1, wherein the gasket extends across an upper annular surface of the lens adjacent to the convex surface.

3. The lens and diffusion grate combination of claim 2, wherein the gasket seals against the upper annular surface and the outer edge of the lens.

4. The lens and diffusion grate combination of claim 2, the diffusion grate including an annular base surrounding the concave base, wherein the annular base is configured to engage the gasket that extends across the upper surface of the lens.

* * * * *